H. A. J. MANOURY.
Process and Apparatus for Preparing Saccharate of Lime and Obtaining Sugar.
No. 232,995. Patented Oct. 5, 1880.
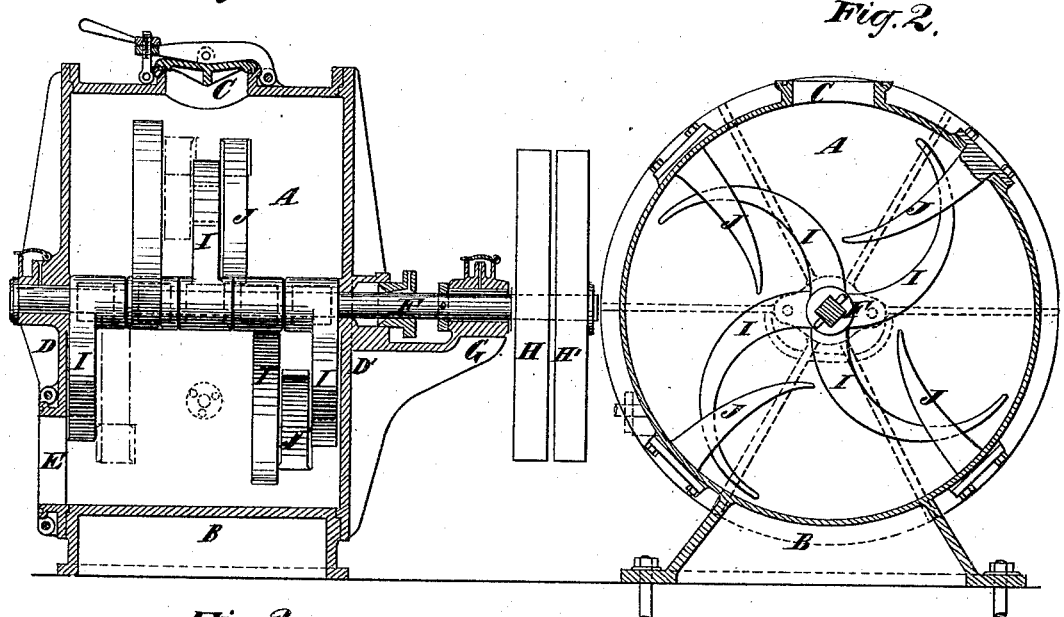

UNITED STATES PATENT OFFICE.

HENRY A. J. MANOURY, OF PARIS, FRANCE.

PROCESS AND APPARATUS FOR PREPARING SACCHARATE OF LIME AND OBTAINING SUGAR.

SPECIFICATION forming part of Letters Patent No. 232,995, dated October 5, 1880.

Application filed July 8, 1879. Patented in England October 18, 1877, in Germany November 1, 1877, in Austria January 24, 1878, in Russia July 3, 1879, and in Italy June 30, 1879. Brevets in France March 15, 1877, and October 4, 1877, and in Belgium September 6, 1877, and October 8, 1877.

*To all whom it may concern:*

Be it known that I, HENRY ARMAND JOSEPH MANOURY, of the city of Paris, in the Republic of France, have invented certain new and useful Improvements in Process and Apparatus for Preparing Saccharate of Lime and Obtaining Sugar, for which were granted Letters Patent of the government of Great Britian, dated October 18, 1877, Letters Patent of the government of Germany, dated November 1, 1877, Letters Patent of the government of Austria, dated January 24, 1878, Letters Patent of the government of Russia, dated July 3, 1879, Letters Patent of the government of Italy, dated June 30, 1879, brevets of the government of France, dated, respectively, March 15, 1877, and October 4, 1877, and brevets of the government of Belgium, dated, respectively, September 6, 1877, and October 8, 1877, and of which the following is a specification.

My improvements relate to a process for preparing the granular tribasic saccharate of lime from molasses and to apparatus for use in connection therewith.

Up to this time the processes employed for the preparation and treatment of saccharates for the purpose of the extraction of the sugar contained in the molasses are very complicated, and present numerous inconveniences. In fact, the processes in which the saccharate is obtained in a pasty state have been abandoned by reason of the difficulty which the desiccation of the saccharates presents, and in the processes in which anhydrous lime reduced to powder is employed to effect the mixture with the molasses, the saccharate obtained is excessively hard, and is required to be ground or pulverized in very powerful machines. My new method, on the contrary, is very simple and inexpensive, may be operated in a small space, and consequently may be introduced in all the sugar-houses where it is desired to introduce the process of maceration with diluted alcohol. This new method gives directly a granular saccharate of lime by trituration in the apparatus, which will be hereinafter described. The molasses and the lime in powder are prepared as follows:

*Preparation of the molasses.*—The molasses intended to be used in the operation is evaporated in a pan to from 38° to 42° Baumé, according to the quantity of sugar contained in the molasses. The molasses, evaporated to the desired degree, has added to it, in the same pan, from five to ten per cent. of carbonate of soda to precipitate the salts of lime contained in the molasses, the quantity of crystals of soda added varying according to the salts of lime contained therein. The molasses thus prepared is afterward cooled before submitting it to the operation for the fabrications of granular saccharate.

*Preparation of the lime.*—The anhydrous lime coming from the furnace is plunged in water in such manner as to impregnate the lumps or particles, which are afterward placed in heaps. Under the action of water and heat the lime falls to powder, the state in which it is employed.

*Manufacture of granulated saccharate and* *description of the apparatus to produce it.*—The lime, prepared as hereinabove described, on being mixed with the molasses which has been prepared as above stated, forms a combination which hardens instantly. It is necessary, then, in order to divide it, to employ a very energetic and powerful apparatus.

The accompanying drawings represent an apparatus which may be used for this purpose.

In the drawings, Figure 1 represents a central longitudinal section of my improved apparatus; Fig. 2, a transverse section thereof, and Fig. 3, a plan view thereof.

Similar letters of reference designate corresponding parts in all the figures.

A designates a drum or cylinder, placed horizontally upon a bed-plate, B, which may be cast with it. This drum has in its upper part a man-hole, C, serving for the charging of the apparatus. The two heads D and D' of the drum may be attached to it by means of bolts, and one of the heads, D, is provided in its lower part with an exit port or passage, E.

A shaft, F, placed in the center of the drum, passes longitudinally through it, and is supported at one end in a bearing in the head D, passes through a stuffing-box in the other head, D', and is further supported by a bearing on a bracket, G. (Shown as cast with the latter head.) This shaft is furnished with driving-pulleys H H', or it may be driven by gearing.

The part of the shaft F contained within the drum is square, and carries five curved arms or stirrers, I.

Extending inwardly from the drum are forward arms or blades, J, also curved, which are arranged in the spaces between the arms upon the shaft F. These arms or blades J are inserted through the side of the chamber or drum, and are provided at their outer ends with flanges, which are bolted to the chamber. This arrangement permits of their being readily removed from the outside of said chamber.

To make the saccharate it is sufficient to introduce into the apparatus, through the upper man-hole, a quantity—say one hundred and fifty kilograms—of molasses for an apparatus of which the drum would be, say, forty inches in diameter and thirty inches in interior length. There should also be put into the drum one hundred to one hundred and twenty kilograms of powdered lime, according as it may be more or less free from impurities. Experiments will have to be made to determine this quantity. The charging being finished, I put the apparatus in operation. The shaft F of the mixer should make from ninety to one hundred revolutions a minute. I allow it to turn for about one-half a minute, then I open the exit-port E and allow it to continue to turn several times, by which the apparatus empties itself completely into a receptacle placed under the mixer, and the product may be then taken to the macerator.

The saccharate obtained presents itself in the form of grains, of which the smallest are about one millimeter in thickness, and the largest several millimeters. In this state the saccharate of lime is in fit condition to be submitted to maceration, for, as the grains are formed with lime which is not completely slaked, it follows that when the grains of saccharate are submitted to maceration the lime-absorbing water causes the grains to crack, and allows them to be penetrated to the center by the alcoholic liquid, which dissolves the salts of potash and soda and leaves insoluble the salt of lime, which is very slightly soluble in diluted alcohol. The organic matters are also dissolved, for they are themselves very soluble in diluted alcohol.

The saccharate having been prepared as above described is now ready for further treatment. A suitable quantity of the saccharate having been placed in a suitable cylinder or chamber, alcohol is admitted in quantity to submerge the saccharate, and the saccharate and alcohol are allowed to digest for several hours. The impure alcohol is then drawn off by means of a cock at the bottom of the cylinder or chamber, and fresh alcohol added, the flow of the alcohol from the cylinder or chamber continuing until the complete drainage of all liquid from the saccharate is effected. Steam is then introduced into the cylinder or chamber, through perforated coils or other devices, to effect the distillation of the remaining alcohol. The alcoholic vapors are allowed to escape through a pipe at the top of the apparatus, and are conducted to a condenser, where they are condensed. It is known that the distillation is finished when the liquid flowing from the condenser marks zero upon the hydrometer. The entrance of steam is then stopped, and the discharge-pipe of the cylinder or chamber being opened the liquefied saccharate flows out therefrom into a monte-jus, which sends it to the bone-black filters. The sugar-juice or purified saccharate is evaporated by the ordinary means, or it may be added to the juice of beet-root to replace the milk of lime, and it is then subjected to the same series of operations as the juice of beet-root.

I am aware that it is not new to provide a granulating or triturating apparatus in which a rotary shaft is provided with arms or blades, and the interior of a cylinder or drum is provided with inwardly-extending arms or blades, interposed between the arms or blades on the shaft. This I do not claim as my invention.

What I claim as my invention, and desire to secure by Letters Patent, is—

1. The process of obtaining sugar from molasses, consisting in first mixing lime with the molasses and forming saccharate of lime, lixiviating or purifying the saccharate by means of diluted alcohol, and subsequently extracting the sugar by filtration and evaporation, substantially as specified.

2. In obtaining sugar from molasses, the process of producing a dry granular saccharate of lime, consisting in mixing powdered anhydrous lime with molasses suitably prepared, and granulating or triturating the solid substance thus formed, substantially as specified.

3. The combination, with the chamber A and shaft F, of the curved arms or stirrers I, mounted upon said shaft, and the inwardly-extending curved arms or blades J, arranged between the said arms or stirrers I, passing through the side of the chamber, and provided upon their outer ends with flanges, which are secured to the exterior of the chamber, substantially as and for the purpose specified.

H. MANOURY.

Witnesses:
POZZO DI BORGO,
E. DUBUIL.